United States Patent
Li et al.

(10) Patent No.: US 12,385,636 B2
(45) Date of Patent: Aug. 12, 2025

(54) LIQUID FUEL SELF-SUSTAINING COMBUSTION BURNER FOR FLAME SYNTHESIS

(71) Applicant: TSINGHUA UNIVERSITY, Beijing (CN)

(72) Inventors: Shui-Qing Li, Beijing (CN); Xing Jin, Beijing (CN); Min-Hang Song, Beijing (CN); Yi-Yang Zhang, Beijing (CN); Ze-Yun Wu, Beijing (CN); Shu-Ting Lei, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 503 days.

(21) Appl. No.: 17/894,178

(22) Filed: Aug. 24, 2022

(65) Prior Publication Data
US 2023/0228415 A1 Jul. 20, 2023

(30) Foreign Application Priority Data

Jan. 18, 2022 (CN) .......................... 202210054349.8

(51) Int. Cl.
*F23D 11/10* (2006.01)
*F23D 11/38* (2006.01)

(52) U.S. Cl.
CPC .......... *F23D 11/383* (2013.01); *F23D 11/105* (2013.01); *F23D 2202/00* (2013.01)

(58) Field of Classification Search
CPC ... F23D 11/383; F23D 11/105; F23D 2202/00

USPC ......................................................... 431/182
See application file for complete search history.

(56) References Cited

U.S. PATENT DOCUMENTS

| | | | | |
|---|---|---|---|---|
| 3,713,588 A | * | 1/1973 | Sharpe | F23D 11/107 239/431 |
| 4,082,495 A | * | 4/1978 | Lefebvre | F23D 11/406 431/352 |
| 4,364,522 A | * | 12/1982 | Reider | F23R 3/14 239/399 |
| 5,090,619 A | * | 2/1992 | Barthold | F04F 5/466 239/428 |
| 5,407,347 A | * | 4/1995 | Bortz | F23D 14/02 431/354 |
| 5,471,840 A | * | 12/1995 | Lovett | F23D 14/70 60/737 |

(Continued)

*Primary Examiner* — Avinash A Savani

(57) ABSTRACT

The present disclosure relates to a liquid fuel self-sustaining combustion burner for flame synthesis, including a swirl-flow cylinder and a stable combustion cylinder. A swirl-flow plate is disposed at an open end of the swirl-flow cylinder and defines swirl-flow outlets. A tangential inlet tube is mounted on the swirl-flow cylinder and in fluid communication with the swirl-flow chamber. An open end of the swirl-flow cylinder extends into the stable combustion chamber. The fuel can be atomized by an atomizer and sprayed into the stable combustion chamber for combustion. Air introduced from the tangential inlet tube can flow into the swirl-flow chamber and advance spirally around the central stabilizing column to reach the swirl-flow plate. The airflow is partially injected into the stable combustion chamber through the swirl-flow outlets, and then continues to spirally advance. An atomizing nozzle of the atomizer is located inside the swirling airflow.

20 Claims, 7 Drawing Sheets

(56) References Cited

U.S. PATENT DOCUMENTS

| | | | | |
|---|---|---|---|---|
| 5,491,972 | A * | 2/1996 | Bretz | F23D 11/383 60/39.821 |
| 5,511,970 | A * | 4/1996 | Irwin | F23D 17/002 431/9 |
| 5,700,143 | A * | 12/1997 | Irwin | F23D 17/002 431/182 |
| 6,238,206 | B1 * | 5/2001 | Cummings, III | F23D 14/74 431/5 |
| 9,774,050 | B2 * | 9/2017 | Finnerty | H01M 8/04201 |
| 2003/0022123 | A1 * | 1/2003 | Wolf | F23D 11/103 239/468 |
| 2008/0305445 | A1 * | 12/2008 | Roberts | F23D 11/446 431/9 |

* cited by examiner

B-B

I

LIQUID FUEL SELF-SUSTAINING COMBUSTION BURNER FOR FLAME SYNTHESIS

CROSS-REFERENCE TO RELATED APPLICATIONS

This application claims priority to Chinese patent application No. 202210054349.8, filed on Jan. 8, 2022 the content of which is hereby incorporated by reference in its entirety.

TECHNICAL FIELD

The present disclosure relates to the field of nanomaterial synthesis, and in particular to a liquid fuel self-sustaining combustion burner for flame synthesis.

BACKGROUND

Nanomaterials have been widely used in various fields for the small particle sizes, large specific surface areas, and excellent optical and electrical properties thereof. At present, nanomaterials are mainly synthesized by the methods such as chemical synthesis and flame synthesis. The chemical synthesis approaches mainly include chemical vapor deposition, sol-gel synthesis, liquid deposition, and hydrothermal synthesis. Compared with chemical synthesis and the nanomaterials formed thereby, flame synthesis is a one-step method and the nanomaterials obtained by flame synthesis have high purity and good controllability of particle size. In flame synthesis and other industrial technologies, swirling flames have been widely used due to the good flame stability, low nitrogen oxide emission, and low lean burn limit thereof. With further development, flame synthesis technology has entered an industrial application phase from laboratory use in synthesis of nanomaterials. How to increase the yield and quality of nanopowders or nanoparticles formed through flame synthesis by a single burner and promote the stable distribution and flexible adjustment of the combustion flame zone, so as to realize safe, stable and flexible operation in mass production are key technical issues to be addressed in the field of swirling flame synthesis of nanomaterials.

SUMMARY

In view of this, the present disclosure provides a liquid fuel self-sustaining combustion burner for flame synthesis.

A liquid fuel self-sustaining combustion burner for flame synthesis includes a swirl-flow cylinder, a central stabilizing column, a swirl-flow plate, an atomizer, a tangential inlet tube, and a stable combustion cylinder.

The swirl-flow cylinder defines a swirl-flow chamber therein and includes an open end. The central stabilizing column is disposed in the swirl-flow chamber. The swirl-flow plate is disposed at the open end of the swirl-flow cylinder, the swirl-flow plate is supported by the central stabilizing column, and at least one swirl-flow outlet is defined in the swirl-flow plate. The atomizer is disposed between the swirl-flow plate and the central stabilizing column, and the atomizer includes an atomizing nozzle. The tangential inlet tube is mounted on the swirl-flow cylinder and fluid communicated with the swirl-flow chamber, and an axial direction of the tangential inlet tube is tangential to an outer surface of a sidewall of the swirl-flow cylinder. The stable combustion cylinder defines a stable combustion chamber therein.

The open end of the swirl-flow cylinder extends into the stable combustion chamber, the atomizer is capable of atomizing and spraying a fuel into the stable combustion chamber for combustion, the tangential inlet tube is capable of introducing a first airflow into the swirl-flow chamber and allowing the airflow to advance spirally around the central stabilizing column, thereby forming a swirling airflow to reach the swirl-flow plate, the swirl-flow plate is capable of partially injecting the swirling airflow into the stable combustion chamber through the at least one swirl-flow outlet and allowing the swirling airflow to spirally advance in the stable combustion chamber, and the atomizing nozzle is configured to be located inside the swirling airflow.

In some embodiments, the liquid fuel self-sustaining combustion burner of further includes at least one swirl vane, wherein the at least one swirl vane includes a connecting portion and a blocking portion, the connecting portion and the blocking portion are connected to each other to form a bent shape, the connecting portion is connected to the swirl-flow plate at a side away from the swirl-flow chamber, the blocking portion shields the at least one swirl-flow outlet, such that the swirling airflow is capable of flowing between the at least one swirl-flow outlet and the blocking portion and flowing into the stable combustion chamber along a tangential direction of the stable combustion cylinder.

In some embodiments, a projection of the blocking portion along an axial direction of the swirl-flow plate substantially coincides with the at least one swirl-flow outlet, and a gap exists between the blocking portion and the at least one swirl-flow outlet.

In some embodiments, the at least one swirl vane is a plurality of swirl vanes, the plurality of swirl vanes includes inner circle swirl vanes and outer circle swirl vanes, the inner circle swirl vanes are arranged at intervals along a circumferential direction of the swirl-flow plate and are adjacent to a center of the swirl-flow plate, the outer circle swirl vanes are arranged at intervals along the circumferential direction of the swirl-flow plate and are adjacent to an outer edge of the swirl-flow plate, the inner circle swirl vanes are spaced from and staggered with the outer circle swirl vanes along the radial direction of the swirl-flow plate.

In some embodiments, the inner circle swirl vanes are evenly spaced from each other along the circumferential direction of the swirl-flow plate, and the outer circle swirl vanes are evenly spaced from each other along the circumferential direction of the swirl-flow plate.

In some embodiments, the liquid fuel self-sustaining combustion burner further includes a connecting rod, the swirl-flow cylinder includes a closed end opposite to the open end, the central stabilizing column is inserted into the swirl-flow chamber through the closed end, and the central stabilizing column is fixedly connected to the closed end, one end of the connecting rod is fixedly connected to the central stabilizing column, and the other end of the connecting rod is fixedly connected to the swirl-flow plate.

In some embodiments, the liquid fuel self-sustaining combustion burner further includes a fixing bracket sleeved on one end of the central stabilizing column away from the closed end of the swirl-flow cylinder, and an outer side surface of the fixing bracket abuts against an inner surface of the sidewall of the swirl-flow cylinder, the connecting rod protrudes from the fixing bracket toward the swirl-flow plate, one end of the connecting rod is fixedly connected to the central stabilizing column through the fixing bracket.

In some embodiments, the fixing bracket includes a center disk and a protruding rod extending radially outward from the center disk, the center disk is sleeved and fixed on the one end of the central stabilizing column, the distal end of the protruding rod abuts against the inner surface of the sidewall of the swirl-flow chamber.

In some embodiments, the atomizer includes a main body, one end of the main body abuts against the fixing bracket, and another end of the main body is inserted into a center hole of the swirl-flow plate, the atomizing nozzle abuts against the swirl-flow plate at a side away from the swirl-flow chamber, the atomizing nozzle is fixedly connected to the main body, the fuel is capable of flowing into the main body and being ejected from the atomizing nozzle.

In some embodiments, the liquid fuel self-sustaining combustion burner further includes a direct-flow structure, wherein the direct-flow structure is located between the swirl-flow cylinder and the stable combustion cylinder, the direct-flow structure includes a direct-flow channel, a direct-flow inlet, and a direct-flow outlet, the direct-flow inlet and the direct-flow outlet are both connected to the direct-flow channel, the direct-flow outlet is in fluid communication with the stable combustion chamber, the direct-flow outlet is in an annular shape, a second airflow is capable of flowing into the direct-flow channel through the direct-flow inlet, and being ejected into the stable combustion chamber along the axial direction of the stable combustion chamber from the direct-flow outlet, the direct-flow outlet is located at an outer side of the swirl-flow plate along the radial direction of the stable combustion cylinder.

In some embodiments, a gap is defined between an outer peripheral surface of the swirl-flow plate and an inner surface of the sidewall of the swirl-flow cylinder, thereby forming a sidewall flow channel, a portion of the swirling airflow that reaches the swirl-flow plate is ejected into the stable combustion chamber along the axial direction of the stable combustion chamber through the sidewall flow channel.

In some embodiments, the sidewall flow channel has an annular shape.

In some embodiments, the liquid fuel self-sustaining combustion burner further includes a separator, wherein the stable combustion cylinder further defines a protecting flow chamber therein, the protecting flow chamber has an annular shape, the stable combustion cylinder is connected with a protecting flow inlet tube, the protecting flow inlet tube is in fluid communication with the protecting flow chamber, along the radial direction of the stable combustion cylinder, the protecting flow chamber is located outside the stable combustion chamber, the separator is disposed between the stable combustion chamber and the protecting flow chamber, a plurality of airflow holes are defined in the separator, the stable combustion chamber is in fluid communication with the protecting flow chamber through the plurality of airflow holes, a third airflow introduced from the protecting flow inlet tube is capable of being sprayed into the stable combustion chamber through the plurality of airflow holes, thereby forming a protective air layer on an inner side surface of the separator.

In some embodiments, the separator has an annular shape, an inner side surface of the separator defines the stable combustion chamber, and the airflow holes are uniformly distributed in the separator.

In some embodiments, a precursor channel and a shear-flow channel are defined inside the atomizer, an outlet of the precursor channel and an outlet of the shear-flow channel are both in fluid communication with the atomizing nozzle, along the radial direction of the stable combustion cylinder, the shear-flow channel is located outside the precursor channel, such that a fourth airflow ejected through the atomizing nozzle is wrapped around the fuel.

In some embodiments, the liquid fuel self-sustaining combustion burner further includes a precursor inlet tube configured to introduce the fuel and a shear-flow inlet tube configured to introduce the fourth airflow, the shear-flow channel is in fluid communication with the shear-flow inlet tube, and the precursor channel is in fluid communication with the precursor inlet tube, both the precursor inlet tube and the shear-flow inlet tube protrude into the swirl-flow chamber through the sidewall of the swirl-flow cylinder, and are respectively connected to the main body.

In some embodiments, the shear-flow channel has an annular shape, and the precursor channel and the shear-flow channel are coaxially arranged.

The embodiments of the liquid fuel self-sustaining combustion burner is capable of realizing self-sustaining combustion based on central atomized fuel without regular pilot flames, controlling the particle sizes, morphologies and crystal phases of the formed nanoparticles through a flexible adjustment among jet flows, swirl flows and direct flows, and improving the yield and production efficiency of flame synthesis of nanoparticles.

Specifically, in the embodiments of the liquid fuel self-sustaining combustion burner, since the tangential inlet tube that is in fluid communication with the swirl-flow chamber is installed on the swirl-flow cylinder and the axial direction of the tangential inlet tube is tangent to the outer surface of the sidewall of the swirl-flow cylinder, the air flowing into the stable combustion chamber through the tangential inlet tube can spirally advance around the central stabilizing column, thereby forming the swirling airflow. When the swirling airflow reaches the swirl-flow plate, a portion of the swirling airflow is injected into the stable combustion chamber through the swirl-flow outlet and then continues to spirally advance, forming a low pressure area inside the high-speed swirling airflow. The precursor and shearing airflow in the atomizer are ejected at a high speed from the atomizing nozzle, wherein the precursor is wrapped by the shearing airflow. Under the action of the high-speed shearing airflow, the ejected liquid precursor is sheared and broken, resulting in atomization, so that the liquid precursor is broken into small droplets, which are sprayed in a cone shape. Under the action of a high-temperature ignition heat source, the liquid fuel (such as alcohol-based liquid fuel) in the precursor will burn and generate heat, and the salts (such as nitrate or acetate) in the precursor dissolved in the liquid fuel will be subjected to pyrolysis to generate oxide nanoparticles. Meanwhile, a double-layered swirling airflow with a high speed can be formed around the atomized precursor from the inside to the outside. On the one hand, the swirling airflow can supply oxygen for the continuous combustion of the fuel. On the other hand, a low pressure area is formed at the center of the swirling airflow, which promotes recirculation of high-temperature gas, thereby forming a high-temperature recirculation area. Thus, the distribution of the combustion flames and the high-temperature area can be stabilized, which promotes the nucleation, agglomeration and sintering growth of the oxide nanoparticles formed in the combustion process. The axial direct flow ejected from the direct-flow outlet has a high speed, and will thus envelop and carry the flames at the center outward from the converging section to ensure proper flame rigidity and flame length. In addition, the protective airflows ejected from the airflow holes form an air layer on the sidewall of the converging section and the stable combustion chamber, preventing nanoparticles from reaching the vicinity of the sidewall and attaching and consolidating on the sidewall of the converging section and the stable combustion chamber, and playing a cooling effect to protect the sidewall.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

Figure 1:
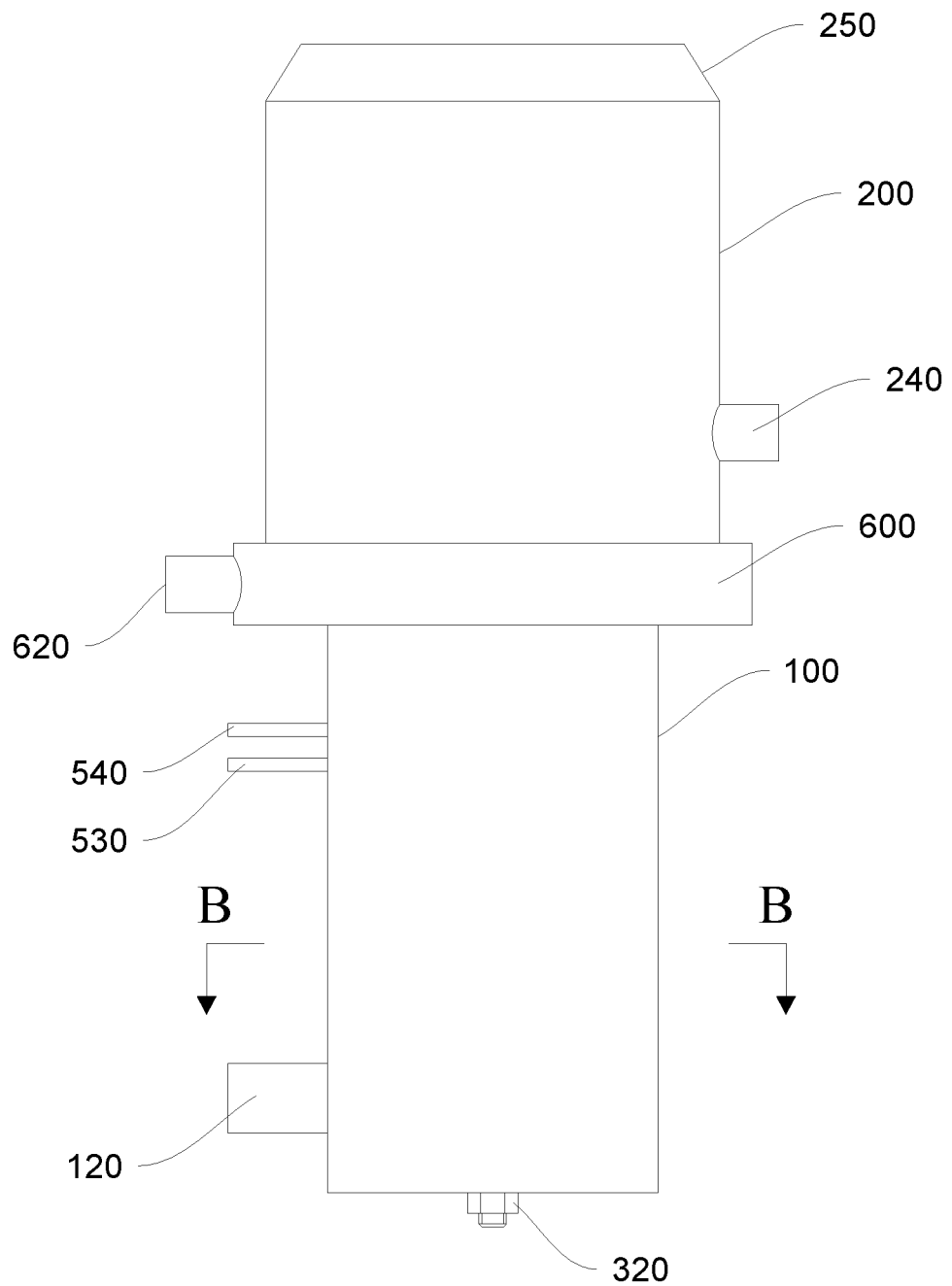
FIG. 1 is a schematic front view of a liquid fuel self-sustaining combustion burner for flame synthesis according to an embodiment of the present disclosure.

REFERENCE NUMBER swirl-flow cylinder 100, swirl-flow chamber 110, tangential inlet tube 120, sidewall flow channel 130;
stable combustion cylinder 200, stable combustion chamber 210, protecting flow chamber 220, separator 230, airflow hole 231, protecting flow inlet tube 240, converging section 250;
central stabilizing column 310, fastening nut 320, fixing bracket 330, center disk 331, protruding rod 332, support 333, connecting rod 340;
swirl-flow plate 400, inner circle swirl vane 410, outer circle swirl vane 420, connecting portion 421, blocking portion 422, swirl-flow outlet 430, extrusion 440, center hole 450, guiding ring 460;
atomizer 500, atomizing nozzle 510, main body 520, precursor channel 521, shear-flow channel 522, precursor inlet tube 530, shear-flow inlet tube 540;
direct-flow structure 600, direct-flow channel 610, direct-flow inlet 620, direct-flow outlet 630.

DETAILED DESCRIPTION

In order to make the above objectives, features and advantages of the present disclosure more clear and understandable, embodiments of the present disclosure will be described in detail below with reference to the accompanying drawings. In the following description, many specific details are explained to make the present disclosure fully understandable. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that the terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. indicate the orientations or positional relationships on the basis of the drawings. These terms are only for describing the present disclosure and simplifying the description, rather than indicating or implying that the related devices or elements must have the specific orientations, or be constructed or operated in the specific orientations, and therefore cannot be understood as limitations of the present disclosure.

In addition, the terms "first" and "second" are used merely as labels to distinguish one element having a certain name from another element having the same name, and cannot be understood as indicating or implying any priority, precedence, or order of one element over another, or indicating the quantity of the element. Therefore, the element modified by "first" or "second" may explicitly or implicitly includes at least one of the elements. In the description of the present disclosure, "a plurality of" means at least two, such as two, three, etc., unless otherwise specifically defined.

In the present disclosure, unless otherwise clearly specified and defined, the terms "installed", "connected", "coupled", "fixed" and other terms should be interpreted broadly. For example, an element, when being referred to as being "installed", "connected", "coupled", "fixed" to another element, unless otherwise specifically defined, may be fixedly connected, detachably connected, or integrated to the other element, may be mechanically connected or electrically connected to the other element, and may be directly connected to the other element or connected to the other element via an intermediate element. For those of ordinary skill in the art, the specific meaning of the above-mentioned terms in the present disclosure can be understood according to specific circumstances.

In the present disclosure, unless otherwise specifically defined, an element, when being referred to as being located "on" or "under" another element, may be in direct contact with the other element or contact the other element via an intermediate element. Moreover, the element, when being referred to as being located "on", "above", "over" another element, may be located right above or obliquely above the other element, or merely located at a horizontal level higher than the other element; the element, when being referred to as being located "under", "below", "beneath" another element, may be located right below or obliquely below the other element, or merely located at a horizontal level lower than the other element.

It should be noted that an element, when being referred to as being "fixed" or "mounted" to another element, may be directly fixed or mounted to the other element or via an intermediate element. Such terms as "vertical", "horizontal", "up", "down", "left", "right" and the like used herein are for illustrative purposes only and are not meant to be the only ways for implementing the present disclosure.

Referring to FIG. 1 to FIG. 3, FIG. 5 and FIG. 10, the present disclosure provides an embodiment of a liquid fuel self-sustaining combustion burner for flame synthesis, including components such as a swirl-flow cylinder 100 and a stable combustion chamber 200. The swirl-flow cylinder 100 defines a swirl-flow chamber 110 therein. A central stabilizing column 310 is installed in the swirl-flow chamber 110. A swirl-flow plate 400 is disposed at an open end of the swirl-flow cylinder 100. The swirl-flow plate 400 is supported by the central stabilizing column 310. An atomizer 500 is disposed between the swirl-flow plate 400 and the central stabilizing column 310. One or more swirl-flow outlets 430 are defined in the swirl-flow plate 400. A tangential inlet tube 120 is mounted on the swirl-flow cylinder 100 and in fluid communication with the swirl-flow chamber 110. An axial direction of the tangential inlet tube 120 is tangential to an outer surface of a sidewall of the swirl-flow cylinder 100. In an embodiment, the axial direction of the tangential inlet tube 120 is perpendicular to both an axial direction and a radial direction of the swirl-flow cylinder 100. The stable combustion cylinder 200 defines a stable combustion chamber 210 therein. The open end of the swirl-flow cylinder 100 extends into the stable combustion chamber 210. A precursor for synthesizing a nanomaterial can be atomized by the atomizer 500 and sprayed into the stable combustion chamber 210 for combustion. Air introduced from the tangential inlet tube 120 can flow into the swirl-flow chamber 110 and advance spirally around the central stabilizing column 310 to reach the swirl-flow plate 400. The airflow that reaches the swirl-flow plate 400 is partially injected into the stable combustion chamber 210 through the swirl-flow outlets 430, and then continues to spirally advance to form a swirling airflow. An atomizing nozzle 510 of the atomizer 500 is located inside the swirling airflow.

Specifically, the swirl-flow cylinder 100 and the stable combustion cylinder 200 both have an approximately cylindrical shape in an embodiment or have a prism shape and other shapes in other embodiments. Based on the perspective view in FIG. 2, the top end of the swirl-flow cylinder 100 is the open end, and the bottom end of the swirl-flow cylinder 100 is a closed end. The vertical direction is the axial direction of the swirl-flow cylinder 100 and the stable combustion cylinder 200. The top and bottom ends of the stable combustion cylinder 200 are both open ends. The stable combustion cylinder 200 includes a converging section 250 located adjacent to the top end. A radial size of the converging section 250 gradually decreases from the bottom to the top. The swirl-flow plate 400 is disposed in the swirl-flow chamber 110 and is located at the opening at the top end of the swirl-flow cylinder 100. The swirl-flow plate 400 extends into the stable combustion chamber 210 along with the top section of the swirl-flow cylinder 100. The central stabilizing column 310 is coaxially installed in the swirl-flow chamber 110. The atomizer 500 is arranged at the center position in the radial direction of the swirl-flow chamber 110. An axial direction of the swirl-flow plate 400 coincides with the axial direction of the swirl-flow cylinder 100. The swirl-flow outlets 430 penetrate the swirl-flow plate 400 along the axial direction of the swirl-flow plate 400. The tangential inlet tube 120 mounted on the swirl-flow cylinder 100 is located at the place adjacent to the closed end of the swirl-flow cylinder 100. The axial direction of the tangential inlet tube 120 is a tangential direction of a position in the outer surface of the sidewall of the swirl-flow cylinder 100. After flowing into the swirl-flow chamber 110 through the tangential inlet tube 120, the airflow will advance in a spiral pattern around the central stabilizing column 310 to form the swirling airflow. When the swirling airflow reaches the swirl-flow plate 400, a portion of the airflow enters the stable combustion chamber 210 through the swirl-flow outlets 430, and continues to spirally advance in the original direction. The swirling airflow surrounds the periphery of the atomizing nozzle 510 of the atomizer 500. The central area of the swirling airflow will form a low-pressure area, and the atomizing nozzle 510 is located inside the swirling airflow. The liquid fuel is sprayed into the central area of the swirling airflow by the atomizer 500. Under the action of a high-temperature ignition heat source, the liquid fuel (such as an alcohol-based liquid fuel) in the precursor will burn and generate heat, and the salts (such as nitrates or acetates) in the precursor dissolved in the liquid fuel will be subjected to pyrolysis, resulting in oxide nanoparticles. On the one hand, the swirling airflow formed around the atomized precursor can supply oxygen for the continuous combustion of the fuel. On the other hand, the low pressure area at the center of the swirling airflow promotes recirculation of the high-temperature gas generated in the combustion of the fuel, thereby forming a high-temperature recirculation area in the inner circle of the swirling airflow, that is, the fuel combustion area. Thus, the high temperature state of the fuel combustion area can be maintained, the flame temperature can be increased, and the distribution of the combustion flames and the high-temperature area can be stabilized, which promotes the nucleation, agglomeration and sintering growth of the oxide nanoparticles formed in the combustion process, and increases the yield and quality of the nanoparticles.

Figure 2:
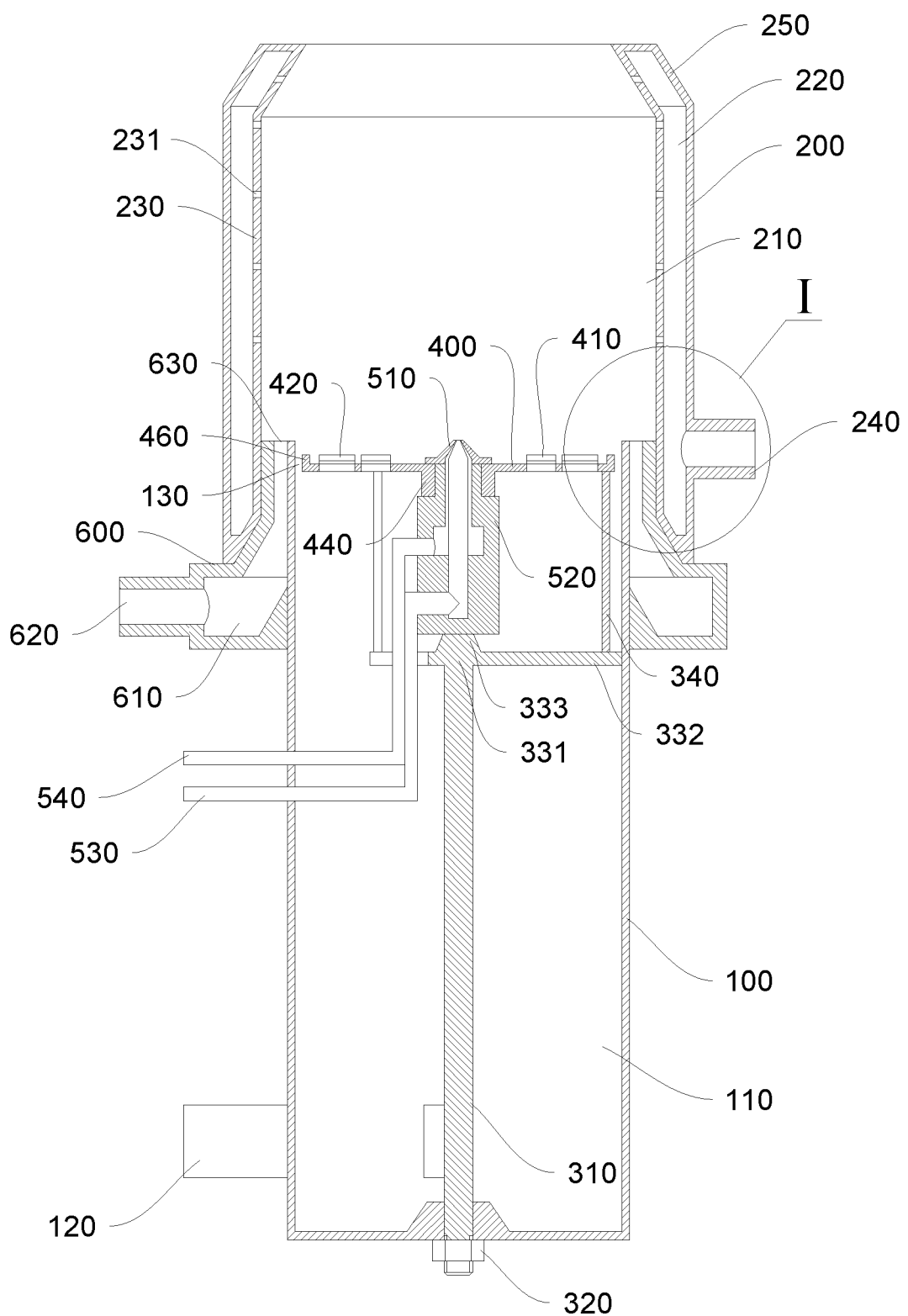
FIG. 2 is a sectional view of the liquid fuel self-sustaining combustion burner for flame synthesis in FIG. 1.
Figure 3:
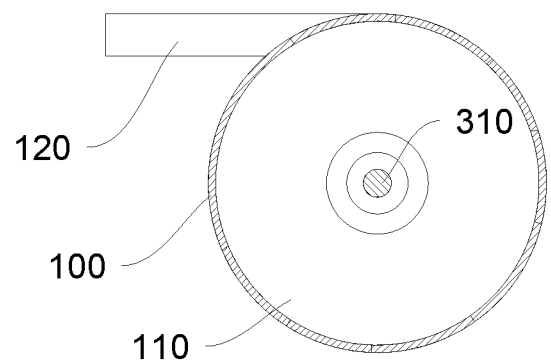
FIG. 3 is a sectional view along the line B-B in FIG. 1.
Figure 4:
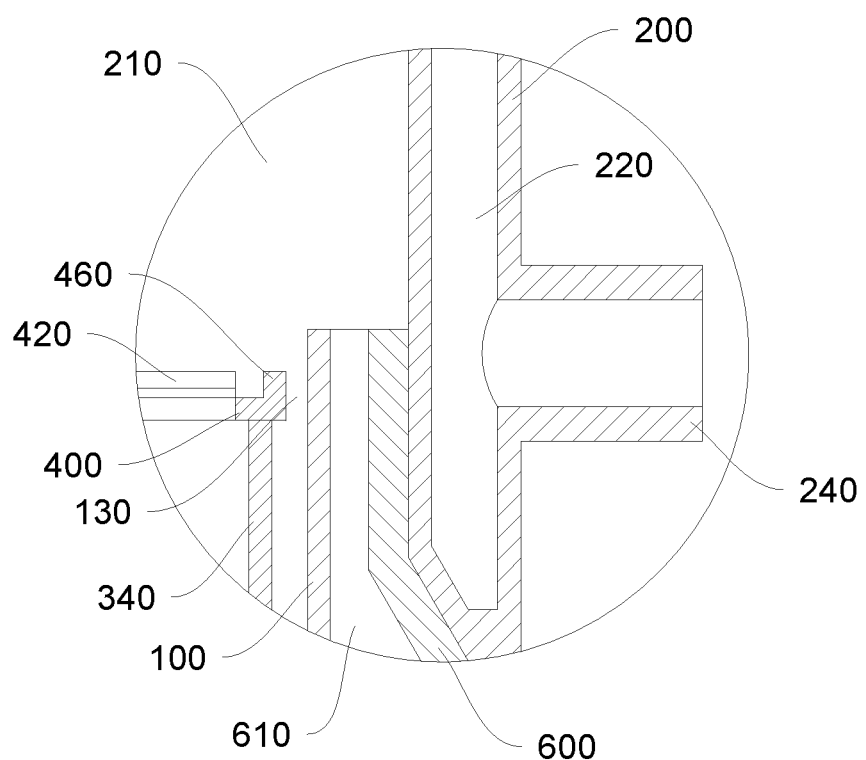
FIG. 4 is a partial enlarged view in the circle I in FIG. 2.

Referring to FIG. 2 and FIG. 4, specifically, in some embodiments, the burner further includes a connecting rod 340. The swirl-flow cylinder 100 includes the closed end located on the opposite side of the open end. The central stabilizing column 310 is inserted into the swirl-flow chamber 110 through the closed end, and the central stabilizing column 310 is fixedly connected to the closed end. One end of the connecting rod 340 is fixedly connected to the central stabilizing column 310, and the other end of the connecting rod 340 is fixedly connected to the swirl-flow plate 400. Specifically, the closed end of the swirl-flow cylinder 100 is provided with a through hole, and the central stabilizing column 310 extends through the through hole into the swirl-flow chamber 110 and extends from the bottom to the top of the swirl-flow chamber 110. The end of the central stabilizing column 310 that is exposed out from the swirl-flow cylinder 100 is threadedly connected with a fastening nut 320, so that the central stabilizing column 310 is fixedly installed on the closed end of the swirl-flow cylinder 100. The top end of the connecting rod 340 is fixedly connected to the swirl-flow plate 400, and the bottom end of the connecting rod 340 is fixedly connected to the central stabilizing column 310. The central stabilizing column 310 supports the swirl-flow plate 400 through the connecting rod 340. In an embodiment, the burner includes a plurality of connecting rods 340, and the plurality of connecting rods 340 are evenly distributed along the circumferential direction of the central stabilizing column 310, so as to improve the stability of the swirl-flow plate 400 supported by the connecting rods 340. The atomizer 500 is at least partially located between the central stabilizing column 310 and the swirl-flow plate 400. By arranging the connecting rods 340, enough space between the central stabilizing column 310 and the swirl-flow plate 400 can be provided for installing the atomizer 500.

Figure 9:
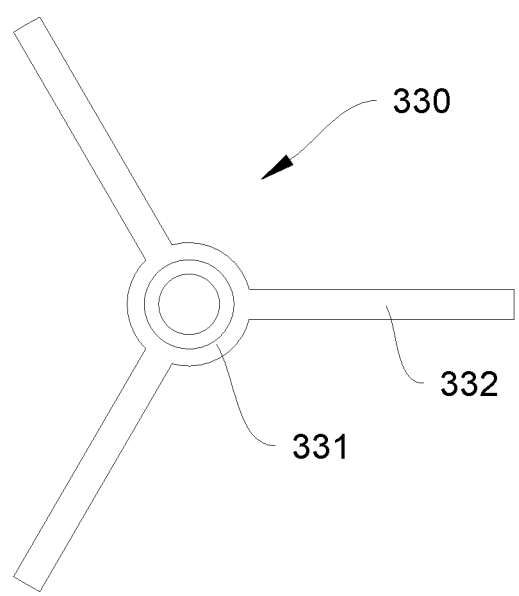
FIG. 9 is a schematic structural view of an embodiment of a fixing bracket of the liquid fuel self-sustaining combustion burner for flame synthesis in FIG. 2.

Referring to FIG. 2 and FIG. 9, in some embodiments, a fixing bracket 330 is sleeved on one end of the central stabilizing column 310 away from the closed end of the swirl-flow cylinder 100. The outer side surface of the fixing bracket 330 abuts against the inner surface of the sidewall of the swirl-flow cylinder 100. The connecting rod 340 protrudes from the fixing bracket 330 toward the swirl-flow plate 400. One end of the connecting rod 340 is fixedly connected to the central stabilizing column 310 through the fixing bracket 330. Specifically, the fixing bracket 330 includes a center disk 331 and a plurality of protruding rods 332 extending radially outward from the outer peripheral surface of the center disk 331. The center disk 331 is sleeved and fixed on the top end of the central stabilizing column 310. The protruding rods 332 are matched in size with the swirl-flow chamber 110 in the radial direction, so that the distal ends of the protruding rods 332 abut against the inner surface of the sidewall of the swirl-flow chamber 110, which limits the radial positions and prevents radial sway of the central stabilizing column 310 and the fixing bracket 330. In addition, the fastening nut 320 limits the axial position of the central stabilizing column 310. Thus, the position of the central stabilizing column 310 installed is relatively stable and is not easy to move. In some embodiments, the number of the connecting rods 340 is equal to the number of the protruding rods 332. The connecting rods 340 are fixedly connected to distal ends of the protruding rods 332 in a one-to-one manner. The top ends of each connecting rods 340 are fixedly connected to the bottom surface of the swirl-flow plate 400. In an embodiment, the number of the protruding rods 332 is three, and the included angle between any two adjacent protruding rods 332 is 120°. Correspondingly, the number of the connecting rods 340 is also three. In other embodiments, the protruding rods 332 can have other quantity or other similar shapes.

Figure 6:
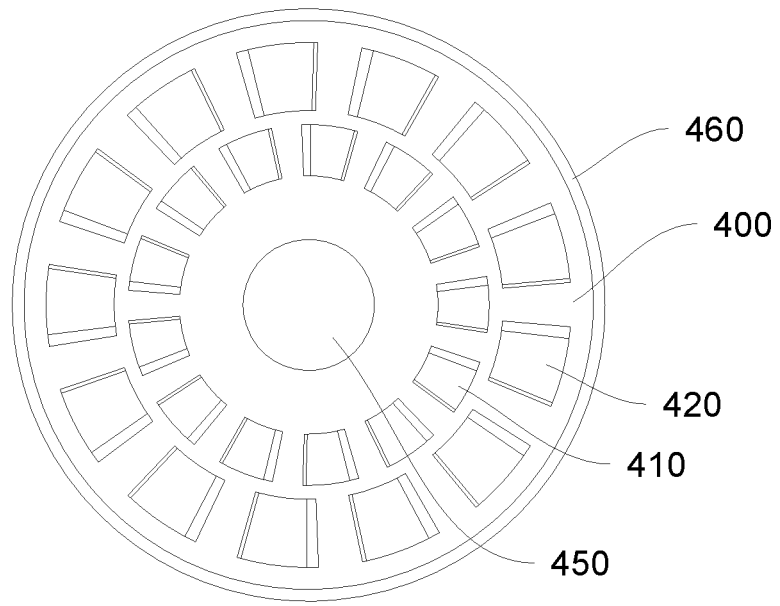
FIG. 6 is a schematic structural view of an embodiment of a swirl-flow plate of the liquid fuel self-sustaining combustion burner for flame synthesis in FIG. 1.
Figure 8:
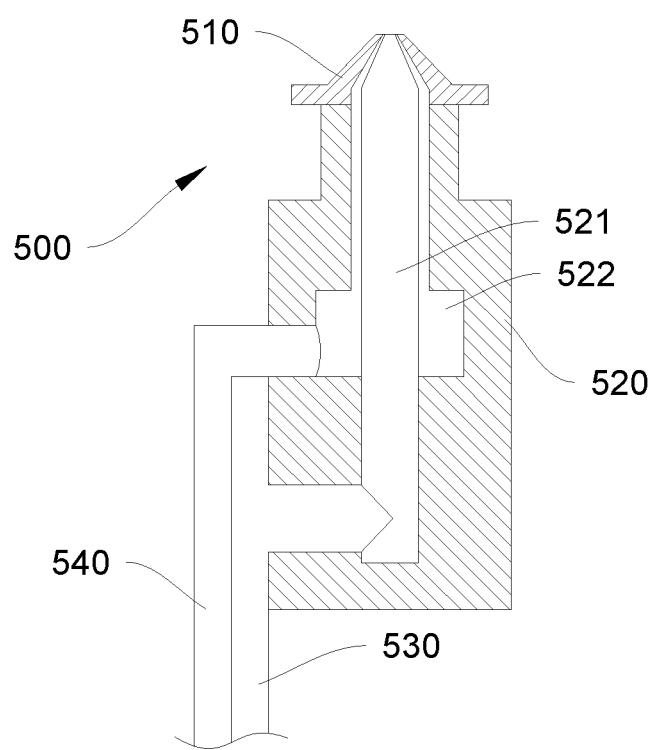
FIG. 8 is a schematic structural view of an embodiment of an atomizer of the liquid fuel self-sustaining combustion burner for flame synthesis in FIG. 2.

Referring to FIG. 2, FIG. 6 and FIG. 8, in some embodiments, the atomizer 500 includes a main body 520. One end of the main body 520 abuts against the fixing bracket 330, and the other end of the main body 520 is inserted into the center hole 450 of the swirl-flow plate 400. The atomizing nozzle 510 abuts against the swirl-flow plate 400 at a side away from the swirl-flow chamber 110. The atomizing nozzle 510 is fixedly connected to the main body 520. The fuel can flow into the main body 520 and be ejected from the atomizing nozzle 510. Specifically, the fixing bracket 330 includes a support 333 protruding upward from the top side of the center disk 331. The bottom of the main body 520 abuts against the support 333. The plate body of the swirl-flow plate 400 has a plate-shaped annular structure. A through hole is defined at the center of the plate body of the swirl-flow plate 400. The swirl-flow plate 400 includes a protrusion 440 downward protruding from the center of the bottom side of the plate body. The protrusion 440 has an annular shape. The inner cavity of the protrusion 440 is in fluid communication with the through hole at the center of the plate body to form the center hole 450 of the swirl-flow plate 400. The top end of the main body 520 is inserted into the center hole 450. The atomizing nozzle 510 is located at the top side of the swirl-flow plate 400. The radial size of the outer edge of the atomizing nozzle 510 is larger than the radial size of the center hole 450, so that the center hole 450 can be fully covered by the atomizing nozzle 510. The atomizing nozzle 510 is fixedly connected to the top end of the main body 520. The bottom end of the atomizing nozzle 510 abuts against the top surface of the swirl-flow plate 400, so that the main body 520 is sandwiched and fixed between the swirl-flow plate 400 and the center disk 331. In some embodiments, the bottom end of the main body 520 can include a groove, and the protrusion 440 can be snapped into the groove to enhance the position limiting effect, so that the main body 520 is not easy to move in the radial direction. The atomizing nozzle 510 and the top end of the main body 520 can be connected by conventional fixing means such as interference fit, a screw fastener, etc. In other embodiments, the atomizer 500 can be entirely disposed between the central stabilizing column 310 and the swirl-flow plate 400, and a through hole can be located at the center of the swirl-flow plate 400, so that the atomizing nozzle 510 can be exposed from the swirl-flow plate 400.

Figure 10:
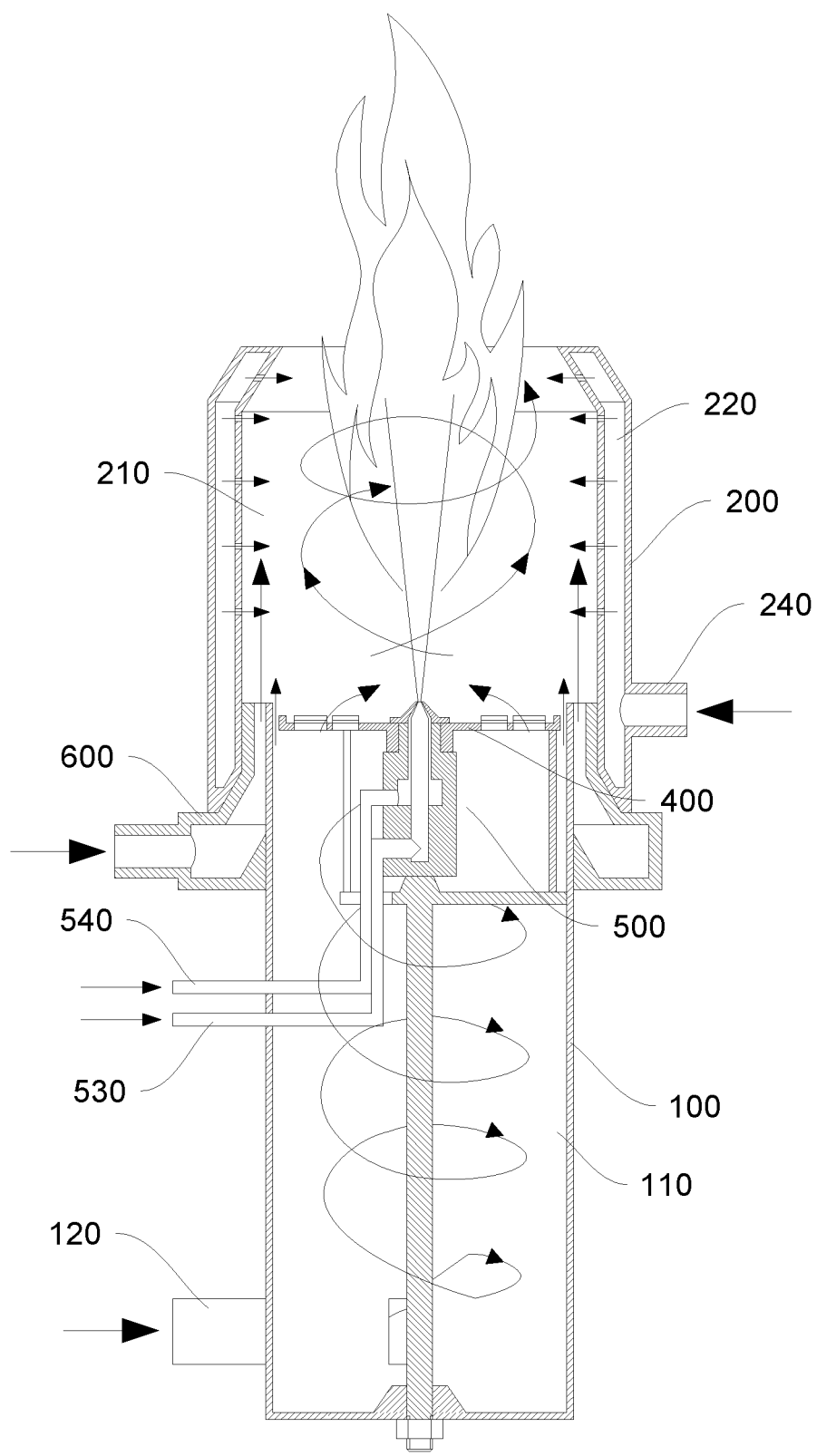
FIG. 10 is a schematic view showing an embodiment of gas flow directions and flame distribution in the liquid fuel self-sustaining combustion burner for flame synthesis in FIG. 1.

Referring to FIG. 2, FIG. 8 and FIG. 10, in some embodiments, a precursor channel 521 and a shear-flow channel 522 are defined inside the atomizer 500. The outlet of the precursor channel 521 and the outlet of the shear-flow channel 522 are both in fluid communication with the atomizing nozzle 510. Along the radial direction of the stable combustion cylinder 200, the shear-flow channel 522 is located outside the precursor channel 521, and the air ejected through the atomizing nozzle 510 will be wrapped around the fuel. Specifically, the precursor channel 521 and the shear-flow channel 522 are located inside the main body 520 of the atomizer 500. The precursor channel 521 and the shear-flow channel 522 are separated from each other. The shear-flow channel 522 is wrapped around the precursor channel 521. The shear-flow channel 522 has an annular shape. The precursor channel 521 and the shear-flow channel 522 are coaxially arranged. The burner further includes a precursor inlet tube 530 and a shear-flow inlet tube 540. The shear-flow channel 522 is in fluid communication with the shear-flow inlet tube 540, and the precursor channel 521 is in fluid communication with the precursor inlet tube 530. Both the precursor inlet tube 530 and the shear-flow inlet tube 540 protrude into the swirl-flow chamber 110 through the sidewall of the swirl-flow cylinder 100, and are respectively connected to corresponding positions of the main body 520. Air flows into the shear-flow channel 522 through the shear-flow inlet tube 540 and then flows into the atomizing nozzle 510. The precursor flows into the precursor channel 521 through the precursor inlet tube 530 and then flows into the atomizing nozzle 510. The precursor is encapsulated by the airflow in the atomizing nozzle 510 and is ejected out together with the airflow from the atomizing nozzle 510 at a high speed. During the ejection process, the airflow will shear and break the precursor, so that the precursor will be atomized, and the liquid precursor will be broken into small droplets. In an embodiment, the atomizing nozzle 510 is in the shape of a hollow cone defining a tapered inner cavity. The radial dimension of the tapered inner cavity gradually decreases from the bottom to the top. The fuel flows from the precursor channel 521 to the tapered inner cavity of the atomizing nozzle 510, and the airflow also flows from the shear-flow channel 522 to the tapered inner cavity of the atomizing nozzle 510. By defining the tapered inner cavity in the atomizing nozzle 510, the angle of the sprayed airflow can be directed toward the precursor located at the center position as much as possible, thereby intensifying the shearing and breaking of the precursor to improve the atomization effect.

Referring to FIG. 2, FIG. 4 and FIG. 10, in some embodiments, the burner further includes a direct-flow structure 600. The direct-flow structure 600 is located between the swirl-flow cylinder 100 and the stable combustion cylinder 200. The direct-flow structure 600 includes a direct-flow channel 610, a direct-flow inlet 620, and a direct-flow outlet 630. The direct-flow inlet 620 and the direct-flow outlet 630 are both connected to the direct-flow channel 610. The direct-flow outlet 630 is in fluid communication with the stable combustion chamber 210. The direct-flow outlet 630 has an annular shape. Air can flow into the direct-flow channel 610 through the direct-flow inlet 620, and be ejected into the stable combustion chamber 210 along the axial direction of the stable combustion chamber 210 from the direct-flow outlet 630. Along the radial direction of the stable combustion cylinder 200, the direct-flow outlet 630 is located at the outer side of the swirl-flow plate 400. Specifically, the direct-flow structure 600 has an annular shape, and is sleeved outside the swirl-flow cylinder 100. The direct-flow structure 600 is located adjacent to the open end of the swirl-flow cylinder 100. The outer peripheral surface of the direct-flow structure 600 is attached to and fits the inner surface of the sidewall of the stable combustion chamber 210. The direct-flow channel 610 is also in an annular shape. The top of the direct-flow channel 610 is opened to form the direct-flow outlet 630 which is in an annular shape. The airflow is sprayed upward through the direct-flow outlet 630. Since the direct-flow outlet 630 is located at the peripheral side of the swirl-flow plate 400, the annular shaped direct airflow sprayed upward through the direct-flow outlet 630 will surround and wrap the swirling airflow. The direct airflow has a high speed and will thus envelop and carry the flames at the center outward from the converging section 250 to ensure proper flame rigidity and flame length, thereby promoting combustion and facilitating the synthesis of the nanoparticles.

Referring to FIG. 2, FIG. 4 and FIG. 10, in some embodiments, there is a gap between the outer peripheral surface of the swirl-flow plate 400 and the inner surface of the sidewall of the swirl-flow cylinder 100 to form a sidewall flow channel 130. The sidewall flow channel 130 has an annular shape. A portion of the air that reaches the swirl-flow plate 400 is ejected into the stable combustion chamber 210 along the axial direction of the stable combustion chamber 210 through the sidewall flow channel 130. Specifically, the radial size of the swirl-flow plate 400 is smaller than the radial size of the swirl-flow chamber 110, so as to form the annular shaped sidewall flow channel 130 between the outer peripheral surface of the swirl-flow plate 400 and the inner surface of the sidewall of the swirl-flow chamber 110. When the swirling airflow reaches the swirl-flow plate 400, a portion of the airflow enters the stable combustion chamber 210 through the swirl-flow outlets 430, and another portion of the airflow is ejected into the stable combustion chamber 210 through the sidewall flow channel 130 along the axial direction of the stable combustion chamber 210. The portion of the airflow ejected from the sidewall flow channel 130 forms an annular shaped direct airflow, which surrounds and wraps around the swirling airflow together with the annular shaped direct airflow sprayed upward from the direct-flow outlet 630, carrying and directing the flames at the center outward from the converging section 250 to ensure proper flame rigidity and flame length. In an embodiment, the radial periphery of the swirl-flow plate 400 is provided with a guiding ring 460 protruding in a direction away from the swirl-flow chamber 110 (e.g., upwards). The airflow is directed by the guiding ring 460, so that it can be ejected stably along the axial direction of the stable combustion chamber 210.

Figure 7:
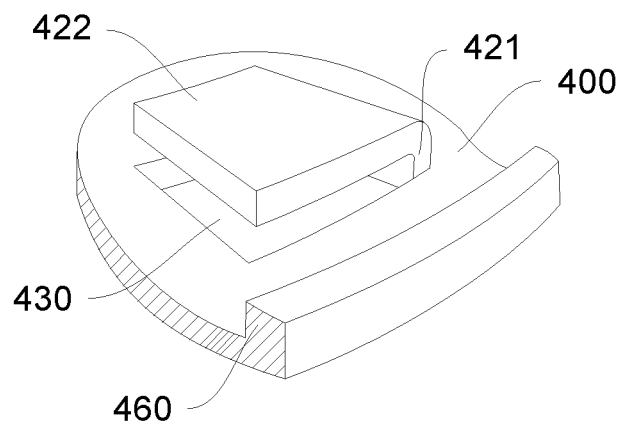
FIG. 7 is a schematic structural view of an embodiment of an outer circle swirl vane and a swirl-flow outlet on the swirl-flow plate in FIG. 6.

Referring to FIG. 2, FIG. 6 and FIG. 7, in some embodiments, the swirl-flow plate 400 further includes one or more swirl vanes. Each swirl vane includes a connecting portion 421 and a blocking portion 422. The connecting portion 421 and the blocking portion 422 are connected to each other to form a bent shape. The connecting portion 421 is connected to the side of the swirl-flow plate 400 facing away from the swirl-flow chamber 110. The blocking portion 422 shields the swirl-flow outlet 430, such that the swirling airflow passes between the swirl-flow outlet 430 and the blocking portion 422 and flows into the stable combustion chamber 210 along a tangential direction of the stable combustion cylinder 200. Specifically, the swirl-flow outlet 430 is an opening defined in the swirl-flow plate 400, which penetrates through the swirl-flow plate 400 along the axial direction of the swirl-flow plate 400 and extends in the swirl-flow plate 400 along the circumferential direction of the swirl-flow plate 400. The swirl-flow outlet 430 has a first edge and a second edge opposite to the first edge in the circumferential direction of the swirl-flow plate 400. The first edge and second edge of the swirl-flow outlet 430 both extend along the radial direction of the swirl-flow plate 400. The connecting portion 421 and the blocking portion 422 both can have a plate shape. The connecting portion 421 can protrude from the swirl-flow plate 400. A thickness direction of the connecting portion 421 can be parallel to the first edge of the swirl-flow outlet 430. The blocking portion 422 can be substantially parallel to the swirl-flow plate 400. The bottom end of the connecting portion 421 is connected to the first edge of the swirl-flow outlet 430, and the top end of the connecting portion 421 is connected to one end of the blocking portion 422. The blocking portion 422 extends along the circumferential direction of the swirl-flow plate 400, such that the other end of the blocking portion 422 reaches the vicinity of the second edge of the swirl-flow outlet 430. A projection of the blocking portion 422 along the axial direction of the swirl-flow plate 400 substantially coincides with the swirl-flow outlet 430 in the swirl-flow plate 400. There is a gap between the blocking portion 422 and the swirl-flow outlet 430. The swirling airflow that reaches the swirl-flow plate 400 partially flow out from the gap between the swirl-flow outlet 430 and the blocking portion 422. Due to a guiding effect of the blocking portion 422, the airflow is injected into the stable combustion chamber 210 tangentially to stable combustion cylinder 200 and the airflow continues to advance upward in a spiral pattern. In an embodiment, the orientation of the gap formed between the swirl-flow outlet 430 and the blocking portion 422 is consistent with the flow direction of the swirling airflow in the swirl-flow chamber 110, so as to reduce the speed loss and turbulent effect of the airflow at the swirl-flow plate 400, and thus the airflow can be sprayed out at a high speed. By punching a region of the swirl-flow plate 400 upwards, the swirl vane and the swirl-flow outlet 430 can both be formed.

In some embodiments, the swirl-flow plate 400 includes a plurality of swirl vanes. Some of the swirl vanes are inner circle swirl vanes 410 and some are outer circle swirl vanes 420. The inner circle swirl vanes 410 are arranged at intervals along the circumferential direction of the swirl-flow plate 400 to form at least one circle adjacent to the center of the swirl-flow plate 400. The outer circle swirl vanes 420 are arranged at intervals along the circumferential direction of the swirl-flow plate 400 to form at least one circle adjacent to the outer edge of the swirl-flow plate 400. The inner circle swirl vanes 410 are spaced from and staggered with the outer circle swirl vanes 420 along the radial direction of the swirl-flow plate 400. Specifically, an embodiment of the structure of the outer circle swirl vane 420 is shown in FIG. 7. The structure of the inner circle swirl vane 410 is similar to that of the outer circle swirl vane 420, and only the size and position are different. In an embodiment, the inner circle swirl vanes 410 are evenly spaced from each other along the circumferential direction of the swirl-flow plate 400, and the outer circle swirl vanes 420 are evenly spaced from each other along the circumferential direction of the swirl-flow plate 400, so that the sprayed airflows can be evenly distributed along the circumferential direction of the swirl-flow plate 400. The positions of the inner circle swirl vanes 410 and the positions of the outer circle swirl vanes 420 are staggered with each other along the radial direction and the circumferential direction of the swirl-flow plate 400. By including the two circles of staggered swirl vanes, a double-layered swirling airflow with a high speed can be formed, so as to promptly replenish oxygen for the combustion and easily from a low-pressure central area, which are beneficial to improve the ability of the overall circumferentially swirling airflow to build a high-temperature recirculation area, to improve the self-sustaining combustion ability of the flames, and to improve the stability of the flames.

Figure 5:
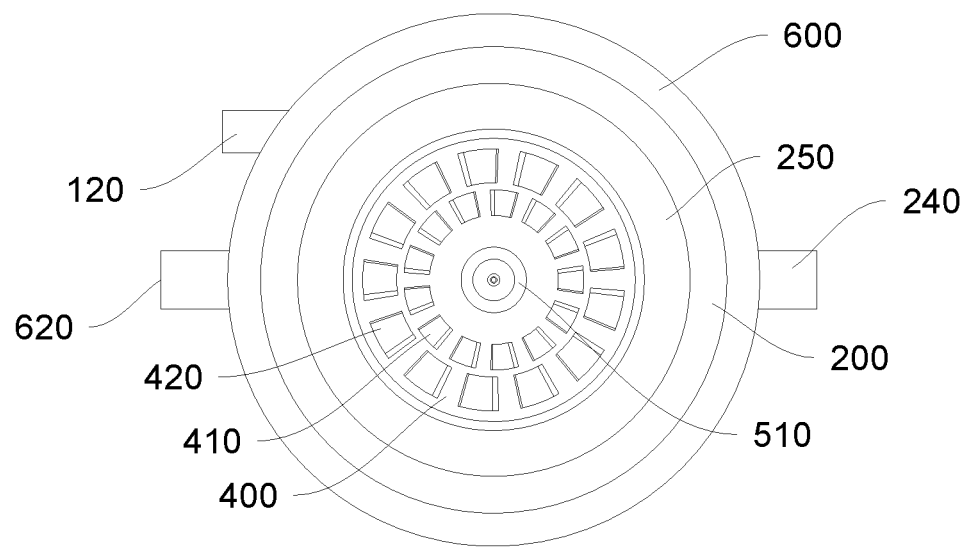
FIG. 5 is a top view of the liquid fuel self-sustaining combustion burner for flame synthesis in FIG. 1.

Referring to FIG. 2, FIG. 5, and FIG. 10, in some embodiments, the stable combustion cylinder 200 further defines an annular protecting flow chamber 220 therein. The stable combustion cylinder 200 is connected with a protecting flow inlet tube 240. The protecting flow inlet tube 240 is in fluid communication with the protecting flow chamber 220. Along the radial direction of the stable combustion cylinder 200, the protecting flow chamber 220 is located outside the stable combustion chamber 210. A separator 230 is disposed between the stable combustion chamber 210 and the protecting flow chamber 220 to separate the stable combustion chamber 210 and the protecting flow chamber 220 from each other. A plurality of airflow holes 231 are defined in the separator 230. The stable combustion chamber 210 is in fluid communication with the protecting flow chamber 220 through the airflow holes 231. Air is introduced from the protecting flow inlet tube 240 and is sprayed into the stable combustion chamber 210 through the airflow holes 231, thereby forming a protective air layer on the inner side surface of the separator 230. Specifically, the separator 230 has an annular shape, and the inner side surface of the separator 230 defines the stable combustion chamber 210. The airflow holes 231 are uniformly distributed in the separator 230 along the axial direction and the circumferential direction. After flowing into the protecting flow inlet tube 240, the air is split by the airflow holes 231 into low speed airflows that are ejected into the stable combustion chamber 210 to form protective airflows. The protective airflows ejected from the airflow holes 221 form the air layer on the sidewall of the stable combustion chamber 210, so that the nanoparticles formed in the flame synthesis are not easy to reach the vicinity of the sidewall of the chamber 210, so that they are not easy to attach and consolidate on the sidewall of the chamber 210. In addition, the protective airflow can also play a cooling effect to protect the sidewall of the chamber 210.

Referring to FIG. 2 and FIG. 10, during the combustion process in the liquid fuel self-sustaining combustion burner for flame synthesis of the present disclosure, there are mainly five air or liquid flows participate in the flame synthesis of the nanoparticles, specifically including a swirling airflow, a direct airflow, a protective airflow, a precursor flow, and a shearing airflow, the details are as follows:

The swirling airflow, which is mainly a flow of air, is formed by the air entered the swirl-flow chamber 110 of the swirl-flow cylinder 100 from the tangential inlet tube 120. Since the tangential inlet tube 120 is tangentially arranged on the outer sidewall of the swirl-flow cylinder 100, the airflow will swirl after entering the swirl-flow chamber 110. The high-speed swirling airflow spirally advances from the bottom to the top of the swirl-flow chamber 110. After reaching the swirl-flow plate 400, the swirling airflow will be divided into three kinds of airflows and sprayed out into the stable combustion chamber 210. The three kinds of airflows are respectively the axial swirling airflows ejected at a high speed from the corresponding swirl-flow outlets under the airflow guiding effect of the inner circle swirl vanes 410, the axial swirling airflows ejected at a high speed from the corresponding swirl-flow outlets under the airflow guiding effect of the outer circle swirl vanes 420, and the direct airflow ejected from the sidewall flow channel 130.

The direct airflow, which is mainly a flow of air, is formed by the air entered from the direct-flow inlet 620. Under the action of the stabilization and uniform distribution of the direct-flow channel 610 in the direct-flow structure 600, the direct airflow is ejected out along the axial direction from the direct-flow outlet 630 at the top end of the direct-flow channel 610.

The protective airflow, which is mainly a flow of air, is formed by the air entered from the protecting flow inlet tube 240. Under the action of the airflow distribution function of the protecting flow chamber 220, the protective airflow is ejected at a low speed from the plurality of airflow holes 231 in the separator 230.

The precursor flow, which is mainly a mixture of a liquid fuel (such as an alcohol-based liquid fuel) and a precursor salt (such as nitrate or acetate), is formed by the liquid entered the precursor channel 521 from the precursor inlet tube 530 under the action of an external booster pump, and is ejected from the atomizing nozzle 510.

The shearing airflow, which is mainly a flow of air, is formed by the air entered the shear-flow channel 522 from the shear-flow inlet tube 540 under the action of an external booster blower, and is ejected from the atomizing nozzle 510 at a high speed.

First, compared with the conventional technical solution of arranging the pilot flames around the atomized precursor, a self-sustaining combustion can be realized through the structure and air distribution design of the burner of the present disclosure. The stable combustion cylinder 200 entirely envelops the direct-flow outlet 630 of the direct-flow channel 610. The stable combustion chamber 210 where the powder synthesis process occurs is at the location from the top of the flow plate 400 to the inner side of the converging section 250 of the stable combustion cylinder 200, which is beneficial to increase the flame temperature. Thus, the combustion can fully rely on the heat released from the combustion of the atomized liquid fuel itself, being coupled with the surrounding annular swirling airflow to realize the self-sustaining combustion.

Secondly, the swirling airflow, the direct airflow, and the protective airflow are arranged around the atomized precursor at the center in a sequence from the inside to the outside. In the synthesizing process, through flexible adjustments of the size and position of the high-temperature flame field in the axial distribution and the radial distribution, the nucleation, coalescence and sintering growth of the formed nanoparticles can be flexibly and effectively adjusted, in order to effectively control the particle size, shape, and crystal phase of the synthesized nanoparticles.

Furthermore, the combustion burner for flame synthesis of the present disclosure has a simple structure, is convenient for design and processing, has a low manufacturing cost, and is favorable for mass production.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A liquid fuel self-sustaining combustion burner, comprising:
    a swirl-flow cylinder defining a swirl-flow chamber therein and comprising an open end;
    a central stabilizing column disposed in the swirl-flow chamber;
    a swirl-flow plate disposed at the open end of the swirl-flow cylinder, the swirl-flow plate being supported by the central stabilizing column, at least one swirl-flow outlet being defined in the swirl-flow plate;
    an atomizer disposed between the swirl-flow plate and the central stabilizing column, the atomizer comprising an atomizing nozzle;
    a tangential inlet tube mounted on the swirl-flow cylinder and fluid communicated with the swirl-flow chamber, an axial direction of the tangential inlet tube being tangential to an outer surface of a sidewall of the swirl-flow cylinder;
    a stable combustion cylinder defining a stable combustion chamber therein; and
    at least one swirl vane,
    wherein the open end of the swirl-flow cylinder extends into the stable combustion chamber, the atomizer is capable of atomizing and spraying a fuel into the stable combustion chamber for combustion, the tangential inlet tube is capable of introducing a first airflow into the swirl-flow chamber and allowing the airflow to advance spirally around the central stabilizing column, thereby forming a swirling airflow to reach the swirl-flow plate, the swirl-flow plate is capable of partially injecting the swirling airflow into the stable combustion chamber through the at least one swirl-flow outlet and allowing the swirling airflow to spirally advance in the stable combustion chamber, and the atomizing nozzle is configured to be located inside the swirling airflow;
    wherein the at least one swirl vane comprises a connecting portion and a blocking portion, the connecting portion and the blocking portion are connected to each other to form a bent shape, the connecting portion is connected to the swirl-flow plate at a side away from the swirl-flow chamber, the blocking portion shields the at least one swirl-flow outlet, such that the swirling airflow is capable of flowing between the at least one swirl-flow outlet and the blocking portion and flowing into the stable combustion chamber along a tangential direction of the stable combustion cylinder.

2. The liquid fuel self-sustaining combustion burner of claim 1, wherein a projection of the blocking portion along an axial direction of the swirl-flow plate substantially coincides with the at least one swirl-flow outlet, and a gap exists between the blocking portion and the at least one swirl-flow outlet.

3. The liquid fuel self-sustaining combustion burner of claim 1, wherein the at least one swirl vane is a plurality of swirl vanes, the plurality of swirl vanes comprises inner circle swirl vanes and outer circle swirl vanes, the inner circle swirl vanes are arranged at intervals along a circumferential direction of the swirl-flow plate and are adjacent to a center of the swirl-flow plate, the outer circle swirl vanes are arranged at intervals along the circumferential direction of the swirl-flow plate and are adjacent to an outer edge of the swirl-flow plate, the inner circle swirl vanes are spaced from and staggered with the outer circle swirl vanes along the radial direction of the swirl-flow plate.

4. The liquid fuel self-sustaining combustion burner of claim 3, wherein the inner circle swirl vanes are evenly spaced from each other along the circumferential direction of the swirl-flow plate, and the outer circle swirl vanes are evenly spaced from each other along the circumferential direction of the swirl-flow plate.

5. The liquid fuel self-sustaining combustion burner of claim 1, further comprising a connecting rod, the swirl-flow cylinder comprises a closed end opposite to the open end, the central stabilizing column is inserted into the swirl-flow chamber through the closed end, and the central stabilizing column is fixedly connected to the closed end, one end of the connecting rod is fixedly connected to the central stabilizing column, and the other end of the connecting rod is fixedly connected to the swirl-flow plate.

6. The liquid fuel self-sustaining combustion burner of claim 5, further comprising a fixing bracket sleeved on one end of the central stabilizing column away from the closed end of the swirl-flow cylinder, and an outer side surface of the fixing bracket abuts against an inner surface of the sidewall of the swirl-flow cylinder, the connecting rod protrudes from the fixing bracket toward the swirl-flow plate, one end of the connecting rod is fixedly connected to the central stabilizing column through the fixing bracket.

7. The liquid fuel self-sustaining combustion burner of claim 6, wherein the fixing bracket comprises a center disk and a protruding rod extending radially outward from the center disk, the center disk is sleeved and fixed on the one end of the central stabilizing column, the distal end of the protruding rod abuts against the inner surface of the sidewall of the swirl-flow chamber.

8. The liquid fuel self-sustaining combustion burner of claim 6, wherein the atomizer comprises a main body, one end of the main body abuts against the fixing bracket, and another end of the main body is inserted into a center hole of the swirl-flow plate, the atomizing nozzle abuts against the swirl-flow plate at a side away from the swirl-flow chamber, the atomizing nozzle is fixedly connected to the main body, the fuel is capable of flowing into the main body and being ejected from the atomizing nozzle.

9. The liquid fuel self-sustaining combustion burner of claim 1, further comprising a direct-flow structure, wherein the direct-flow structure is located between the swirl-flow cylinder and the stable combustion cylinder, the direct-flow structure comprises a direct-flow channel, a direct-flow inlet, and a direct-flow outlet, the direct-flow inlet and the direct-flow outlet are both connected to the direct-flow channel, the direct-flow outlet is in fluid communication with the stable combustion chamber, the direct-flow outlet is in an annular shape, a second airflow is capable of flowing into the direct-flow channel through the direct-flow inlet, and being ejected into the stable combustion chamber along the axial direction of the stable combustion chamber from the direct-flow outlet, the direct-flow outlet is located at an outer side of the swirl-flow plate along the radial direction of the stable combustion cylinder.

10. The liquid fuel self-sustaining combustion burner of claim 9, wherein a gap is defined between an outer peripheral surface of the swirl-flow plate and an inner surface of the sidewall of the swirl-flow cylinder, thereby forming a sidewall flow channel, a portion of the swirling airflow that reaches the swirl-flow plate is ejected into the stable combustion chamber along the axial direction of the stable combustion chamber through the sidewall flow channel.

11. The liquid fuel self-sustaining combustion burner of claim 6, wherein the sidewall flow channel has an annular shape.

12. The liquid fuel self-sustaining combustion burner of claim 1, further comprising a separator, wherein the stable combustion cylinder further defines a protecting flow chamber therein, the protecting flow chamber has an annular shape, the stable combustion cylinder is connected with a protecting flow inlet tube, the protecting flow inlet tube is in fluid communication with the protecting flow chamber, along the radial direction of the stable combustion cylinder, the protecting flow chamber is located outside the stable combustion chamber, the separator is disposed between the stable combustion chamber and the protecting flow chamber, a plurality of airflow holes are defined in the separator, the stable combustion chamber is in fluid communication with the protecting flow chamber through the plurality of airflow holes, a third airflow introduced from the protecting flow inlet tube is capable of being sprayed into the stable combustion chamber through the plurality of airflow holes, thereby forming a protective air layer on an inner side surface of the separator.

13. The liquid fuel self-sustaining combustion burner of claim 12, wherein the separator has an annular shape, an inner side surface of the separator defines the stable combustion chamber, and the airflow holes are uniformly distributed in the separator.

14. The liquid fuel self-sustaining combustion burner of claim 1, wherein a precursor channel and a shear-flow channel are defined inside the atomizer, an outlet of the precursor channel and an outlet of the shear-flow channel are both in fluid communication with the atomizing nozzle, along the radial direction of the stable combustion cylinder, the shear-flow channel is located outside the precursor channel, such that a fourth airflow ejected through the atomizing nozzle is wrapped around the fuel.

15. The liquid fuel self-sustaining combustion burner of claim 14, further comprising a precursor inlet tube configured to introduce the fuel and a shear-flow inlet tube configured to introduce the fourth airflow, the shear-flow channel is in fluid communication with the shear-flow inlet tube, and the precursor channel is in fluid communication with the precursor inlet tube, both the precursor inlet tube and the shear-flow inlet tube protrude into the swirl-flow chamber through the sidewall of the swirl-flow cylinder, and are respectively connected to the main body.

16. The liquid fuel self-sustaining combustion burner of claim 14, wherein the shear-flow channel has an annular shape, the precursor channel and the shear-flow channel are coaxially arranged.

17. A liquid fuel self-sustaining combustion burner, comprising:
a swirl-flow cylinder defining a swirl-flow chamber therein and comprising an open end;
a central stabilizing column disposed in the swirl-flow chamber;
a swirl-flow plate disposed at the open end of the swirl-flow cylinder, the swirl-flow plate being supported by the central stabilizing column, at least one swirl-flow outlet being defined in the swirl-flow plate;
an atomizer disposed between the swirl-flow plate and the central stabilizing column, the atomizer comprising an atomizing nozzle;
a tangential inlet tube mounted on the swirl-flow cylinder and fluid communicated with the swirl-flow chamber, an axial direction of the tangential inlet tube being tangential to an outer surface of a sidewall of the swirl-flow cylinder;
a stable combustion cylinder defining a stable combustion chamber therein;
a connecting rod; and
a fixing bracket;
wherein the open end of the swirl-flow cylinder extends into the stable combustion chamber, the atomizer is capable of atomizing and spraying a fuel into the stable combustion chamber for combustion, the tangential inlet tube is capable of introducing a first airflow into the swirl-flow chamber and allowing the airflow to advance spirally around the central stabilizing column, thereby forming a swirling airflow to reach the swirl-flow plate, the swirl-flow plate is capable of partially injecting the swirling airflow into the stable combustion chamber through the at least one swirl-flow outlet and allowing the swirling airflow to spirally advance in the stable combustion chamber, and the atomizing nozzle is configured to be located inside the swirling airflow;
wherein the swirl-flow cylinder comprises a closed end opposite to the open end, the central stabilizing column is inserted into the swirl-flow chamber through the closed end, and the central stabilizing column is fixedly connected to the closed end, one end of the connecting rod is fixedly connected to the central stabilizing column, and the other end of the connecting rod is fixedly connected to the swirl-flow plate;
wherein the fixing bracket is sleeved on one end of the central stabilizing column away from the closed end of the swirl-flow cylinder, and an outer side surface of the fixing bracket abuts against an inner surface of the sidewall of the swirl-flow cylinder, the connecting rod protrudes from the fixing bracket toward the swirl-flow plate, one end of the connecting rod is fixedly connected to the central stabilizing column through the fixing bracket.

18. The liquid fuel self-sustaining combustion burner of claim 17, wherein the fixing bracket comprises a center disk and a protruding rod extending radially outward from the center disk, the center disk is sleeved and fixed on the one end of the central stabilizing column, the distal end of the protruding rod abuts against the inner surface of the sidewall of the swirl-flow chamber.

19. The liquid fuel self-sustaining combustion burner of claim 17, wherein the atomizer comprises a main body, one end of the main body abuts against the fixing bracket, and another end of the main body is inserted into a center hole of the swirl-flow plate, the atomizing nozzle abuts against the swirl-flow plate at a side away from the swirl-flow chamber, the atomizing nozzle is fixedly connected to the main body, the fuel is capable of flowing into the main body and being ejected from the atomizing nozzle.

20. A liquid fuel self-sustaining combustion burner, comprising:

a swirl-flow cylinder defining a swirl-flow chamber therein and comprising an open end;
a central stabilizing column disposed in the swirl-flow chamber;
a swirl-flow plate disposed at the open end of the swirl-flow cylinder, the swirl-flow plate being supported by the central stabilizing column, at least one swirl-flow outlet being defined in the swirl-flow plate;
an atomizer disposed between the swirl-flow plate and the central stabilizing column, the atomizer comprising an atomizing nozzle;
a tangential inlet tube mounted on the swirl-flow cylinder and fluid communicated with the swirl-flow chamber, an axial direction of the tangential inlet tube being tangential to an outer surface of a sidewall of the swirl-flow cylinder;
a stable combustion cylinder defining a stable combustion chamber therein; and
a direct-flow structure;
wherein the open end of the swirl-flow cylinder extends into the stable combustion chamber, the atomizer is capable of atomizing and spraying a fuel into the stable combustion chamber for combustion, the tangential inlet tube is capable of introducing a first airflow into the swirl-flow chamber and allowing the airflow to advance spirally around the central stabilizing column, thereby forming a swirling airflow to reach the swirl-flow plate, the swirl-flow plate is capable of partially injecting the swirling airflow into the stable combustion chamber through the at least one swirl-flow outlet and allowing the swirling airflow to spirally advance in the stable combustion chamber, and the atomizing nozzle is configured to be located inside the swirling airflow;
wherein the direct-flow structure is located between the swirl-flow cylinder and the stable combustion cylinder, the direct-flow structure comprises a direct-flow channel, a direct-flow inlet, and a direct-flow outlet, the direct-flow inlet and the direct-flow outlet are both connected to the direct-flow channel, the direct-flow outlet is in fluid communication with the stable combustion chamber, the direct-flow outlet is in an annular shape, a second airflow is capable of flowing into the direct-flow channel through the direct-flow inlet, and being ejected into the stable combustion chamber along the axial direction of the stable combustion chamber from the direct-flow outlet, the direct-flow outlet is located at an outer side of the swirl-flow plate along the radial direction of the stable combustion cylinder.

\* \* \* \* \*